United States Patent
Trillat et al.

(10) Patent No.: US 11,999,087 B2
(45) Date of Patent: Jun. 4, 2024

(54) METHOD OF MANUFACTURING A TRIM ELEMENT WITH DOUBLE DECORATION

(71) Applicant: FAURECIA INTERIEUR INDUSTRIE, Nanterre (FR)

(72) Inventors: Sebastien Trillat, Poissy (FR); Godefroy Beau, La Garenne Colombes (FR); Franck Edeline, Le Vaumain (FR); Sylvain Belliard, Rouillon (FR); Eric Gaudin, Saint Aubin en Bray (FR)

(73) Assignee: FAURECIA INTERIEUR INDUSTRIE, Nanterre (FR)

(*) Notice: Subject to any disclaimer, the term of this patent is extended or adjusted under 35 U.S.C. 154(b) by 0 days.

(21) Appl. No.: 17/856,385

(22) Filed: Jul. 1, 2022

(65) Prior Publication Data
US 2023/0001611 A1   Jan. 5, 2023

(30) Foreign Application Priority Data
Jul. 5, 2021 (FR) ..................... 21 07255

(51) Int. Cl.
*B29C 45/14* (2006.01)
*B29C 45/04* (2006.01)
B29L 31/30 (2006.01)

(52) U.S. Cl.
CPC ........ *B29C 45/14065* (2013.01); *B29C 45/04* (2013.01); *B29C 45/14688* (2013.01);
(Continued)

(58) Field of Classification Search
CPC ........ B29C 45/14065; B29C 45/14688; B29C 45/14508; B29C 2045/14516
See application file for complete search history.

(56) References Cited

U.S. PATENT DOCUMENTS 5,053,179 A * 10/1991 Masui ..................... B29C 33/14
264/278
5,759,464 A * 6/1998 Matsumoto ........... B29C 70/541
264/258
(Continued)

FOREIGN PATENT DOCUMENTS

DE   102018100576 A1   7/2019
EP         1160070   * 12/2001
(Continued)

OTHER PUBLICATIONS

French Search Report corresponding to French Application No. FR 2107255, dated Mar. 2, 2022, 2 pages.

*Primary Examiner* — Edmund H Lee
(74) *Attorney, Agent, or Firm* — Reising Ethington P.C.

(57) ABSTRACT

A manufacturing method for a trim element, which includes the following steps: supplying a mold in an open configuration which has a first mold part and a second mold part; positioning a first pre-formed decoration against the first mold part; positioning a wedge in contact with an edge of the first decoration; positioning a second flexible décor; closing the mold in a closed configuration, where the second decoration sits between the two mold parts; and back-injecting a substrate into the molding cavity, where the second decoration is pushed by the substrate against the first decoration. Also provided is an associated manufacturing device.

9 Claims, 5 Drawing Sheets

(52) U.S. Cl.
CPC ............ *B29C 2045/14713* (2013.01); *B29L 2031/3005* (2013.01)

(56) References Cited

U.S. PATENT DOCUMENTS

| | | | | |
|---|---|---|---|---|
| 5,962,034 | A | * | 10/1999 | Matsumoto ....... B29C 45/14508 425/111 |
| 7,241,412 | B2 | * | 7/2007 | Cesano ............... B29C 45/1418 264/250 |

FOREIGN PATENT DOCUMENTS

| | | |
|---|---|---|
| EP | 3517271 A1 | 7/2019 |
| WO | 200023302 A1 | 4/2000 |

\* cited by examiner

METHOD OF MANUFACTURING A TRIM ELEMENT WITH DOUBLE DECORATION

TECHNICAL FIELD

The present invention relates to a method for manufacturing by back-injection, a trim element with a decorated surface.

The present invention further relates to an associated device.

BACKGROUND

Document EP 3 517 271 A1 describes a manufacturing method for a molded part with a visible surface having different surface areas. A plurality of films is arranged in a mold, so that when the mold is closed, at least two films are placed side by side. A first substrate is injected into a first portion of the molding cavity, then a carriage is moved to a retracted position so as to create a second cavity. A second substrate is introduced into the second cavity.

In this way, a molded part with two surface zones is obtained, having a visual effect produced by a film.

However, a limited number of visual effects can be produced this way. Moreover, the link between the zones is not fluid.

SUMMARY

One object of the invention is therefore to propose a manufacturing method of a trim element with a particularly satisfactory visual effect.

For this purpose, an object of the invention is a manufacturing method of a trim element, comprising the following steps:
  supplying a mold comprising a first mold part and a second mold part, where the first mold part has a first molding surface, and the second mold part has a second molding surface, the mold being movable between at least an open configuration and a closed configuration, the first molding surface and the second molding surface together delimit at least partially, a mold cavity in the closed mold configuration, where the mold is in the open configuration,
  positioning a first decoration against the first molding surface, the first decoration being preformed,
  positioning a wedge in contact with at least one edge of the first decoration, said wedge being suitable for maintaining the first decoration at least partially against the first molding surface of the first mold part,
  positioning a second decoration, where the second decoration is flexible,
  closing the mold in the closed configuration, where the second decoration is arranged between the first mold part and the second mold part after the closing of the mold, and
  the back-injection of a substrate into the molding cavity, where the second decoration is being pushed against the first decoration by the substrate during the back-injection.

The application of the second decoration against the first decoration by injecting a substrate produces a special visual effect, by the overlay of materials. In addition, the presence of the wedge allows the first decoration to be retained, so that, during the injection, the first decoration is held in position. The present manufacturing method, therefore, produces a trim element with a well finished and esthetic appearance.

In addition, said method can have one or more of the features below, considered individually or in all technically possible combinations:
  the positioning of the second decoration is performed after the positioning of the wedge;
  during the positioning of the second decoration, the second decoration is placed in contact against the wedge holding the first decoration;
  after closing the mold, the second decoration is squeezed between the second mold part and the wedge;
  the first decoration is provided with a thermal adhesive layer on a contact surface, the second decoration being pushed against the contact surface during the back-injection;
  the wedge partially delimits the molding cavity with the first molding surface and the second molding surface;
  the second decoration is held onto the first mold part, after the positioning thereof;
  a hook is connected to the second mold part, the hook having a holding position, wherein the hook is suitable for holding the wedge against the second mold part, and a free position, wherein said hook does not hold the wedge against the second mold part;
  the hook moves in rotation with respect to the second mold part between the holding position and the free position; and/or
  the second mold part is provided with a return element which brings the hook back into the holding position.

The present invention further relates to a manufacturing device for a trim element, which comprises a mold and a wedge,
  where the mold comprises a first mold part and a second mold part, where the first mold part has a first molding surface, the second mold part has a second molding surface, and the mold is movable between at least an open configuration and a closed configuration, where the first molding surface and the second molding surface together at least partially delimit one molding cavity in the closed mold configuration,
  where the wedge is suitable for at least partially holding a first preformed decoration against the first molding surface of the first mold part through the contact with at least one edge of the first decoration.

Moreover, the device can have the following features:
  the first molding surface and the second molding surface together delimit the molding cavity except for a passage, and wherein the wedge has an end portion including a support surface which extends across the passage, where the support surface is suitable for holding the edge of the first decoration, where a surface of the wedge opposite to the entire surface of the wedge arranged against the first mold part being is suitable for being in contact with a holding portion of the second decoration.

BRIEF DESCRIPTION OF DRAWINGS

Other features and advantages of the invention will appear upon reading the following description of the embodiments of the invention, given as an example only and in reference to the drawings, wherein.

DETAILED DESCRIPTION

An example of an embodiment of a manufacturing method for a trim element, more particularly for a vehicle, here a motor car, will be described in relation to FIGS. 1 to 4.

The manufacturing method comprises the following steps:
supplying a mold,
positioning a first decoration,
positioning a wedge,
positioning a second decoration,
closing the mold, and
the back-injection of a substrate.

In the example described, said steps took place in this order.

Figure 1:
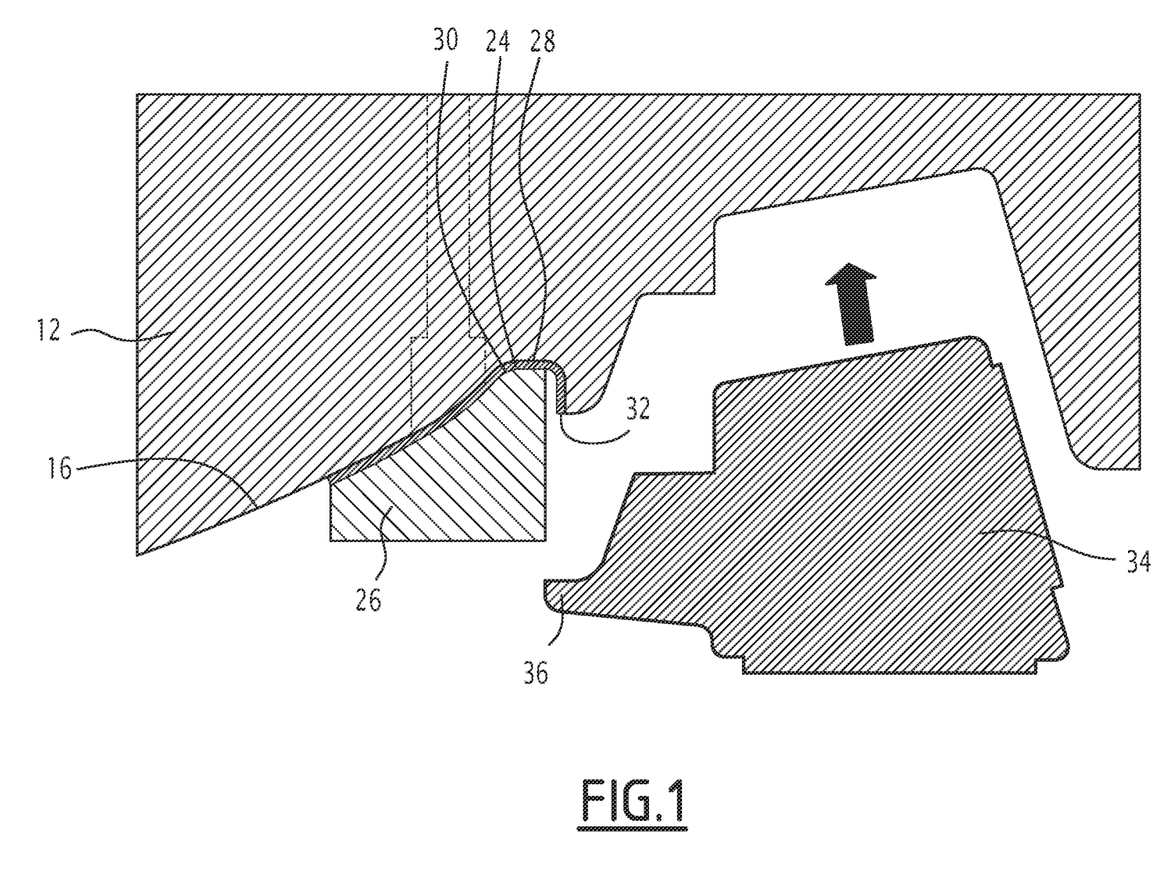
FIG. 1 is a schematic representation of a step of positioning a first decoration according to a method according to one embodiment of the invention.

The mold 10 consists of a first mold part 12 and a second mold part 14.

The first mold part 12 has a first molding surface 16.

The second mold part 14 has a second molding surface 18.

The mold 10 is movable between at least an open configuration and a closed configuration.

In particular, in the example shown, the second mold part 14 is fixed and the first mold part 12 is movable.

Alternatively, the first mold part 12 is movable and the second mold part 14 is fixed. In another embodiment, the first and second mold parts are movable.

In the open configuration, the first part 12 and the second part 14 extend at a distance from each other.

The first molding surface 16 is accessible.

The second molding surface 18 is accessible.

Figure 3:
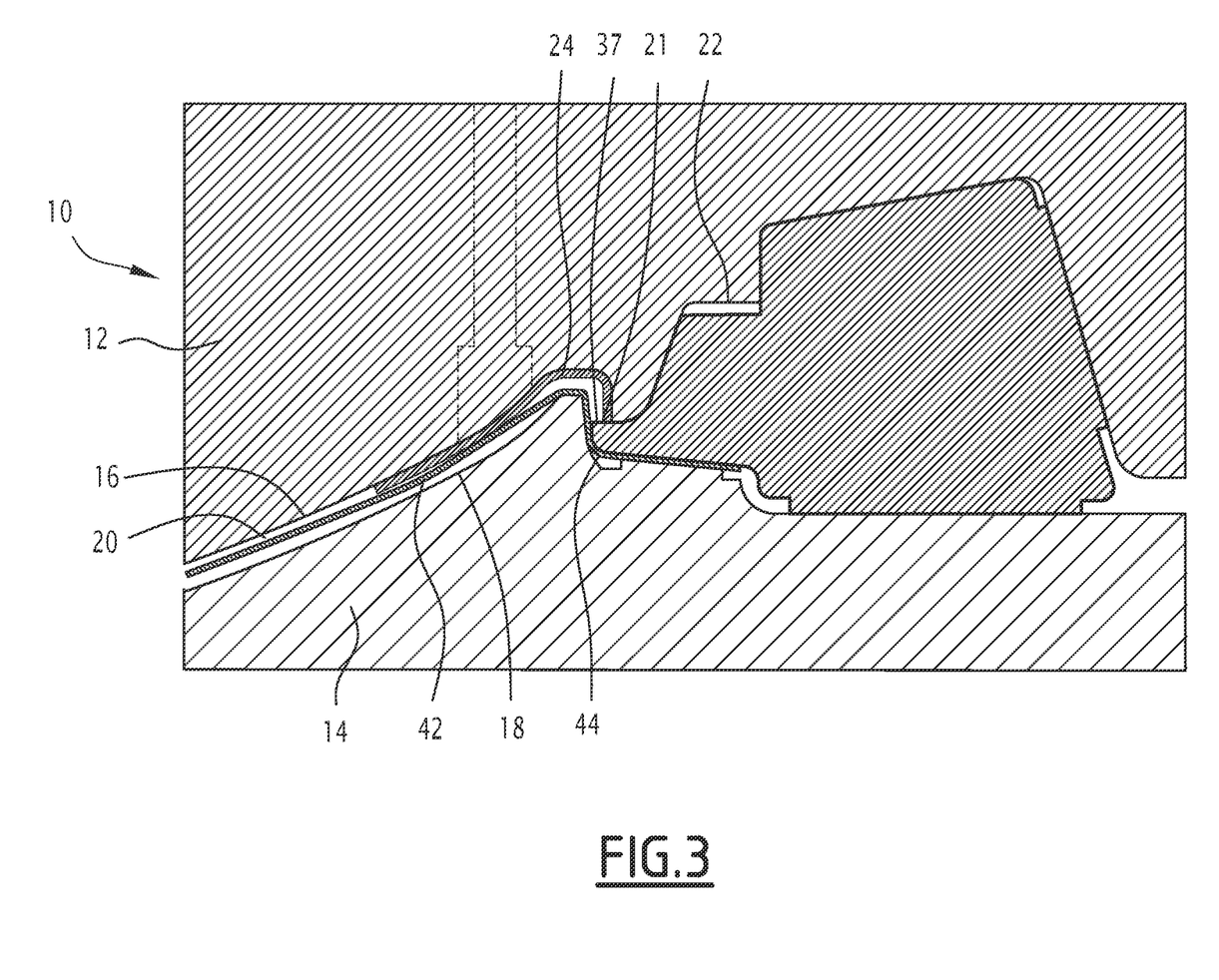
FIG. 3 is a schematic representation of a step of moving the mold to a closed configuration.

In the closed configuration, the first molding surface 16 and the second molding surface 18 together at least partially delimit one molding cavity 20.

In the example shown, the first molding surface 16 and the second molding surface 18 together delimit the molding cavity 20 except for a passage 21.

More particularly, the first molding surface 16 and the second molding surface 18 together delimit the molding cavity 20 and a housing 22, where the interface between the molding cavity 20 and the housing 22 is the passage 21.

In the closed configuration, the first part 12 and the second part 14 are in contact here, more particularly here on an at least partial periphery of the molding cavity 20.

The mold 10 has at least one injection port (not shown) for injecting a substrate into the mold cavity 20 in the closed mold 10 configuration.

The at least one injection port is arranged, e. g., in the second mold part 14.

The at least one injection port is arranged, e. g., opposite the first molding surface 16.

In a particular embodiment, shown with dotted lines, the mold 10 has a vacuum system 23.

The vacuum system 23 comes out, e. g., at the first molding surface 16.

The vacuum system 23 is suitable for applying a drop in pressure at the place where same comes out.

The drop in pressure is, e.g., between −50 mBar and −500 mBar.

In the manufacturing method, the mold 10 is placed in the open configuration beforehand.

The first decoration 24 is fitted against the first molding surface 16.

The first decoration 24 is, e. g., fitted and held against the vacuum system 23, where appropriate.

The first decoration 24 is preformed.

The first decoration 24 is rigid, more particularly here, a rigid shell.

The first decoration 24 is, e. g., made of wood or metal, e. g. of aluminum.

The first decoration 24 has an outer surface 28 with a matching shape of a portion or the whole, here a portion, of the first molding surface 16.

The first decoration 24 is placed against the first molding surface 16, so that the outer surface 28 extends against the first molding surface 16, more particularly so that the matching shapes work together.

The first decoration 24 has a contact surface 30, here opposite to the outer surface 28 according to a thickness of the first decoration 24.

In an advantageous embodiment, the first decoration 24 is provided with a thermoadhesive layer on the contact surface 30.

The first decoration 24 has an edge 32 which links here, the outer surface 28 and the contact surface 30.

The first decoration 24 is placed so that a portion of the edge 32 extends to the interface between the first molding surface 16 and the passage 21.

The first decoration 24 is, e. g., fitted by a first gripping tool 26.

The first gripping tool 26 is adapted to carry the first decoration 24 and place it against the first molding surface 16.

The first gripping tool 26 is suitable, e. g., for carrying the first decoration at the contact surface 30.

The first gripping tool 26 has, e. g., a counter-shape with a matching shape of a portion of the first decoration 24, here a portion of the contact surface 30, here a central portion of the contact surface 30. The first decoration 24 is held by the first gripping tool 26 which arranges the first decoration 24 against the first molding surface 16.

The wedge 34 is then fitted.

The wedge 34 is placed in contact with the edge 32 of the first decoration 24, in particular with the portion of edge 32 extending to the interface between the first molding surface 16 and passage 21.

Preferentially, the wedge 34 is in contact with a portion of the periphery of the first decoration 24.

The wedge 34 is suitable for holding at least part of the first decoration 24 against the first molding surface 16 of the first mold part 12.

The wedge 34 is positioned against the first mold part of the housing 22.

The wedge 34 has a such a shape that when the mold is in the closed configuration, the wedge 34 is held fixed in the housing 22.

The wedge 34 has an end portion 36.

The wedge 34 is positioned so that end portion 36 extends to the location of the passage 21.

The end portion 36 has a support surface 37 which extends across the passage 21.

The edge 32 of the first decoration 24 is held by the end portion 36 of the wedge 34, and more particular is held by pressing against the support surface 37.

After positioning the wedge 34, the first gripping tool 26 is removed.

The first decoration 24 is held by the wedge 34. More particularly, the end portion 36 holds the first decoration 24 against the first molding surface 16.

Figure 2:
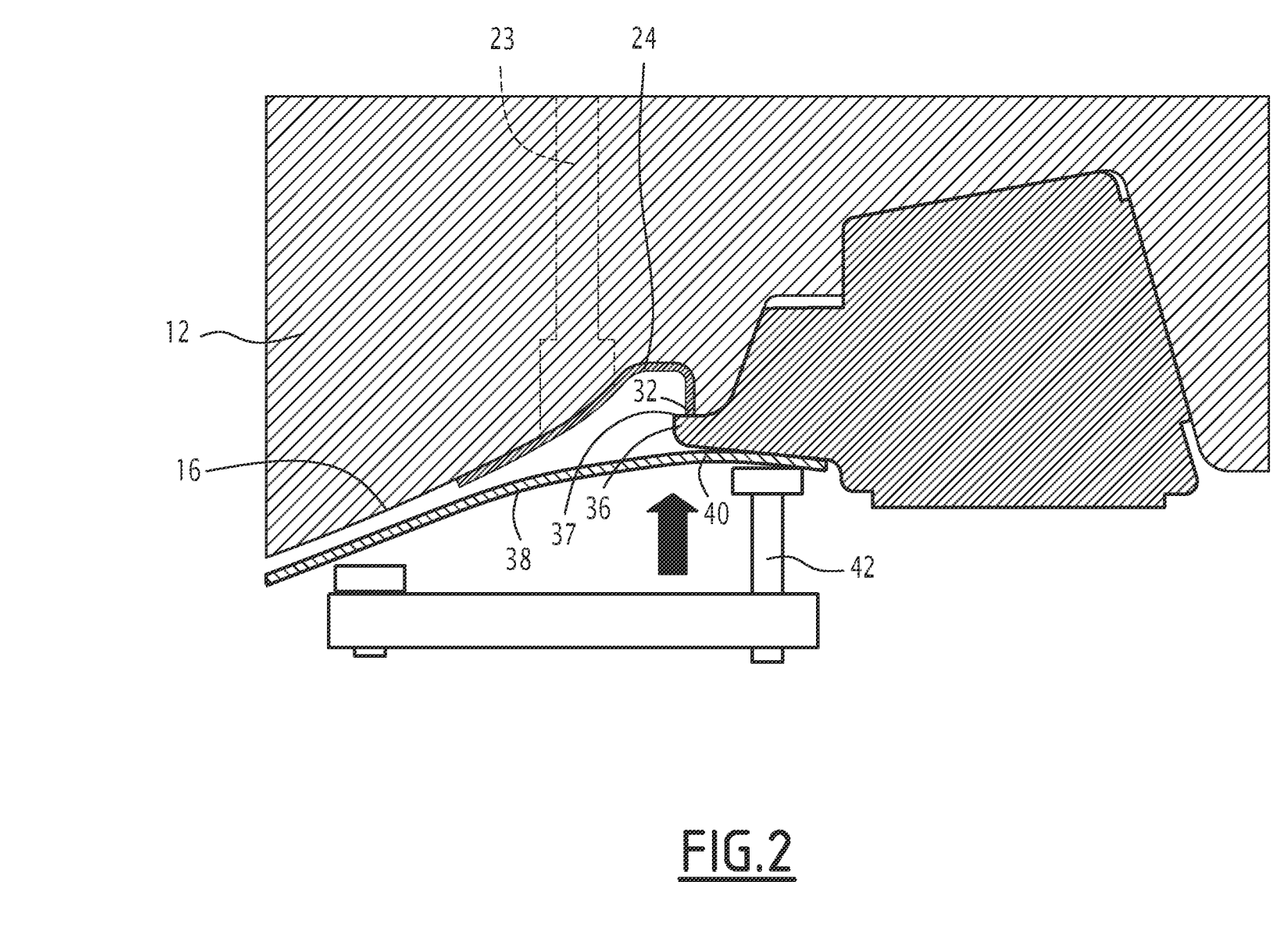
FIG. 2 is a schematic representation of a step of positioning a second decoration.

Then, the second decoration 38 is fitted, as shown for illustrative purposes in FIG. 2.

The second decoration 38 is placed opposite the first mold part 12.

A portion of the second decoration 38, called the holding portion 40, is placed in contact against the wedge 34, more particularly against a surface of the wedge 34 which is not in contact against the first mold part 12.

Said portion 40 of the second decoration 38 extends against a surface of the wedge 34 opposite to the whole surface of the wedge 34 arranged against the first mold part 12, preferentially at least against a surface of the end portion 36 opposite the support surface 37.

A portion of the second decoration 38, extends in front of the whole of the first decoration 24.

Here, the second decoration 38 is set in place by a second gripping tool 42.

The second decoration 38 is flexible.

The second decoration, e. g., has a minimum elastic elongation without deterioration comprised between 10% and 20%.

The second decoration 38 is, e. g., a fabric which has, where appropriate, a non-woven interface layer for the mechanical attachment of the injected thermoplastic.

The second decoration 38 has a thickness between 0.5 times and 2 times the thickness of the first decoration 24.

The second decoration 38 is held, e. g., onto the first mold part 12, after the positioning thereof.

Where appropriate, the vacuum system 23 helps, e.g., to hold the first decoration 24 against the first molding surface 16.

The second gripping tool 42 is then removed.

The mold 10 is then moved into the closed configuration, as shown in FIG. 3 for illustrative purposes.

Here, more particularly, the first mold part 12 is moved so as come into contact with the second mold part 14.

Here, during the closing of the mold, the second mold part 14 deforms the second decoration 38, so as to roughly align the shape of the second decoration 38 with the molding cavity 20.

During the closing of the mold, the second mold part 14 squeezes at least one part of the second decoration 38, which comprises here the holding portion 40.

In the example shown, the second mold part 14 moreover squeezes with the wedge 34, a portion of the second decoration 38 adjacent to the support surface 37.

After the closing of the mold, the mold cavity 20 is delimited by the first mold part 12, the second mold part 14, and the wedge 34.

After the closing of the mold, the second decoration 38 is arranged between the first mold part 12 and the second mold part 14.

More particularly, the second decoration 38 comprises an inner portion 42 arranged in the molding cavity 20 and an outer portion 44 arranged at the housing 22.

After the closing of the mold 10, the outer portion 44 is at least partially pinched between the wedge 34 and the second mold part 14.

The wedge 34 and the second mold part 14 form a sealed connection via the second decoration 38 which is compressed between the wedge 34 and the second mold part 14.

Figure 4:
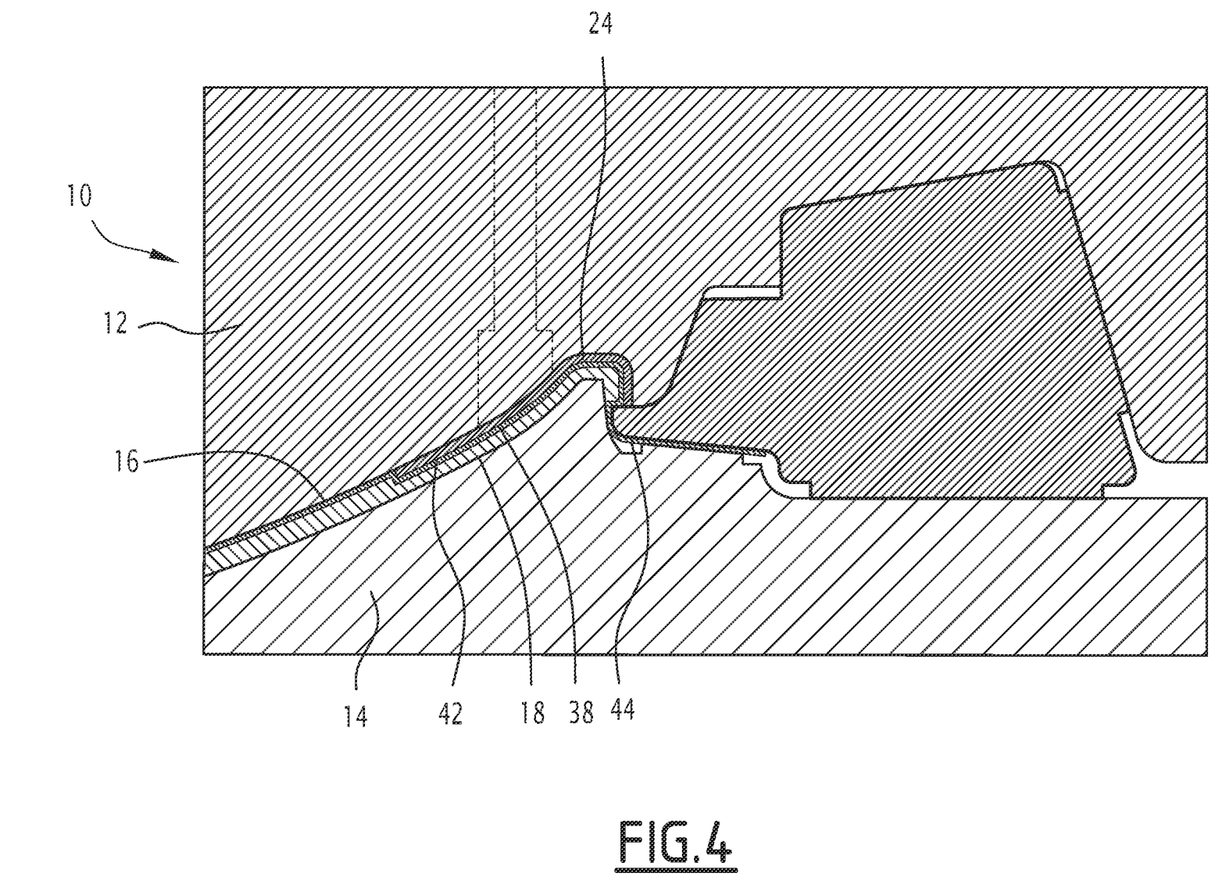
FIG. 4 is a schematic representation of a back-injection step.

The substrate is then injected into the mold 10 in a closed configuration, more particularly into the mold cavity 20.

The substrate is injected, e. g., with a pressure between 200 bar and 500 bar.

The substrate is injected at a temperature between, e. g., 250° C. and 300° C.

The substrate is, for example, a polypropylene (PP) filled with glass fiber, e. g. filled to 30%, or a mixture of polycarbonate and Acrylonitryl styrene butadiene (PC+ABS) filled with glass fibers, e.g. filled to 30%, or a mixture of polycarbonate and Styrene Acrylonitryl (PC+SAN) filled with glass fibers, e. g. filled to 20%.

The second decoration 38 is pushed by the substrate against the first decoration 24, more particularly against the contact surface 30 of the first decoration 24.

Where appropriate, the thermal adhesive layer present on the contact surface 30 is heated and compressed by the injected substrate, so that the adhesive is activated. In this way, a more robust rigid connection is achieved between the first decoration 24 and the second decoration 38.

The second decoration 38, more particularly the inner portion 42, is pressed by the substrate against the first decoration 24, and here against the wedge 34 at the interface 21.

In the example shown, the second decoration 38 has a shape and a dimension such that a portion of the second decoration 38, more particularly a portion of the inner portion 42, is also pressed against the first molding surface 16 outside the first decoration 24, i.e. the second decoration 38 protrudes from the edge of the first decoration 24.

Here, the substrate also presses the second decoration against the edge of the first decoration. Thus, the transition between the first decoration and second decoration is leveled.

The substrate fills the entire free space of the molding cavity 20.

The method then comprises a solidification step.

The solidification step comprises, e. g., a waiting and/or cooling step for the assembly inside the molding cavity, so as to form a solid trim element.

Finally, the mold is moved to the open configuration.

During this opening, the part remains supported by the second mold part 14.

When opening the mold, the wedge is moved, e.g., by means of a pneumatic or hydraulic cylinder.

The movement of the wedge 34 is; e. g. perpendicular to the mold opening direction.

The movement of the wedge 34 moves the wedge 34 away from the mold cavity 20, molding particularly from the passage 21.

The cylinder axis is tilted, e. g., with respect to the direction of opening of the mold.

In this way, the wedge 34 moves with respect to the second mold part 14 perpendicular to the mold opening, so that the resulting undercut is demolded.

The trim element is then ejected, e. g. by ejectors (not shown).

The outer portion 44 of the second decoration 38 is then cut off from the rest of the trim element during a finishing step.

In this way, a particularly satisfactory esthetic appearance is achieved, where the second decoration 38 covers the trim element around the first decoration 24, in particular at the interface level. Thus, when the trim element is integrated into a vehicle, the edges thereof are perfectly integrated.

The wedge is used for making a turn-in.

Figure 5:
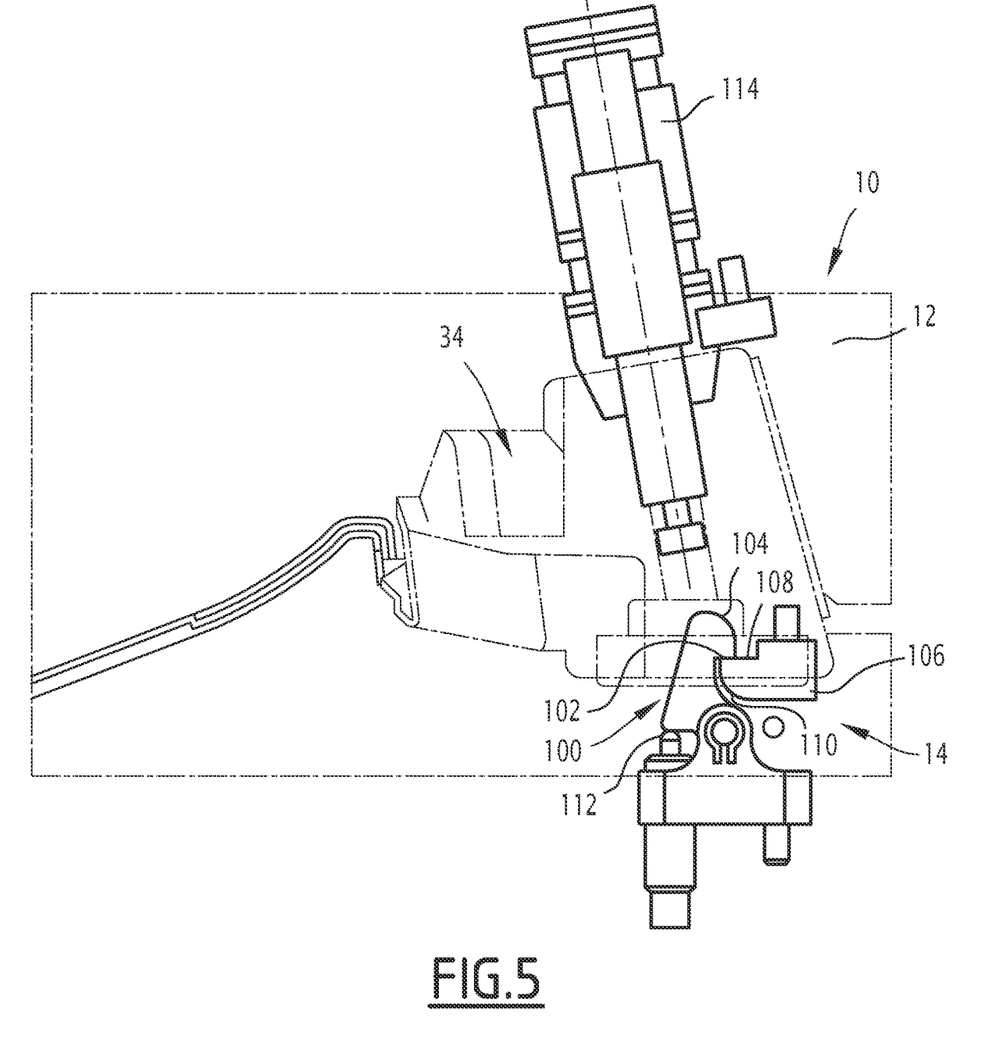
FIG. 5 is a three-dimensional schematic representation of a step in an alternative to the method shown in FIGS. 1 to 4.

A particular embodiment is shown in FIG. 5.

Only the elements which make this embodiment different from the above described embodiment will be described hereafter.

The similar or identical elements are similarly referenced.

In this embodiment, a hook 100 is connected to the second mold part 14.

More particularly, the hook 100 is apt to move relative to the second mold part 14, more particularly to rotate only about a rotation axis O.

The hook 100 is apt to move between a holding position, shown in FIG. 5, and a free position.

The rotation axis O has an axis comprised between, e.g. 80° and 100°, preferentially equal to 90°, with respect to the direction defined between the first mold part 12 and the second mold part 14.

The hook 100 has a shoulder 102.

In particular, the hook 100 comprises a foot and a head, where the shoulder 102 is defined by the head at the junction with the foot.

The foot has a base, where the base of the foot is opposite the head.

The shoulder 102 extends on one side of the hook 100.

The foot is connected to the rotation axis O, on the same side of the hook 100, more particularly at the base.

Here, the shoulder 102 extends parallel to the rotation axis O.

The shoulder 102 extends opposite the rotation axis O along a radial direction.

Moreover, here the hook 100 has a sliding surface 104 with a generally rounded shape.

More particularly, the head has the sliding surface 104.

The sliding surface 104 is contiguous with the shoulder 102.

The shoulder 102 is arranged between the sliding surface 104 and the foot.

Moreover, the hook 100, more particularly the foot, has a contact surface.

The contact surface is arranged opposite the shoulder 102 on the hook 100.

The contact surface is arranged on the base of the foot.

A portion of the base of the foot forms the contact surface.

The wedge 34 is provided with an element 106 matching the hook 100.

The matching element 106 is suitable for mating with the hook 100 in the holding position, when the wedge 34 extends against the second mold part 14, so as to hold the hook 100 and the wedge 34 rigidly connected.

The matching element 106 has, e. g. a shoulder 108 opposite the shoulder 102 of the hook 100.

Moreover, the matching element 106 has a sliding surface 110.

The sliding surface 110 is contiguous with the shoulder 108.

In the holding position and when the wedge 34 extends against the second mold part 14, the shoulder 102 of the hook 100 extends against the shoulder 108 of the matching element.

In the holding position and when the wedge 34 extends against the second mold part 14, the hook 100 is suitable for holding the wedge 34 against the second mold part 14.

In the free position, the hook 100 is swiveled with respect to the holding position, so as to move away from the matching element 106. More particularly, the shoulder 108 of the matching element 102, no longer mates with the shoulder 106 of the hook 100.

Advantageously, the second mold part 14 is further provided with a return element 112 for bringing the hook 100 back into the holding position.

The return element 112 is, e. g. a compression spring.

The return element 112 is in contact with the contact surface of the hook 100.

In the free position, the hook 100 compresses the return element 112, so that the return element 112 applies a force which brings the hook 100 back into the holding position.

The method corresponding to this embodiment will be described hereafter. Only the elements which make this embodiment different from the above-described embodiment are described.

The wedge 34 is fitted against the first mold part 12, where the mold 10 is in the open configuration. In this way, the wedge 34 is placed at a distance from the second mold part 14.

The hook 100 is in the holding position.

The hook 100 does not mate with the matching element 106, more particularly at the corresponding shoulders, since the wedge 34 extends at a distance from the second mold part.

When the mold is moved into the closed configuration, the sliding surface 104 of the hook mates with the sliding surface 110 of the matching element.

The hook 100 is driven, by mating, into the free position, more particularly via the contact between the sliding surfaces.

The return element 112 is compressed.

Once the mold is in the closed position, the second mold part 14 extends against the first mold part 12.

The hook 100 is no longer in contact with the sliding surface 110.

In this way, the return element 112 extends and engages the hook 100.

The hook 100 moves automatically to the holding position by means of the return element.

The shoulders 102, 108 mate so that wedge 34 is held against the second mold part 14.

During the opening of the mold after the back-injection, the wedge 34 is held, e. g. against the second mold part 14, namely at least partly by means of the mating between the hook 100 and the matching element 106.

Thus, the hook 100 helps to hold the wedge against the second mold part, e.g. in addition to a cylinder 114 which is suitable for controlling the movement of the wedge with respect to the first mold part.

The movement of the wedge 34 with respect to the first mold part 12 is driven, e. g. by a pneumatic or hydraulic cylinder.

The presence of the holding hook makes it possible to design a smaller size of cylinder, since a lower pressure is required for extending the wedge when the mold is opening.

Other not shown variants of the method are possible, e.g. the variants described below.

Alternatively, the contact surface of the first decoration 24 is not provided with a heat-adhesive layer, but the surface of the second decoration 38, intended to come into contact with the contact surface of the first decoration 24, is provided with a heat-adhesive layer.

Alternatively, the contact surface of the first decoration 24 and the surface of the second decoration 38, designed to come into contact with the contact surface of the first decoration 24, each have a thermal adhesive layer.

Alternatively, neither the contact surface of the first decoration 24 nor the surface of the second decoration 38, designed to come into contact with the contact surface of the first decoration 24, is provided with a thermal adhesive layer.

In an alternative which is not described, the wedge has a blade at the end portion.

In this way, after the part has solidified, the wedge and/or the part is moved, so that the blade cuts the outer portion of the second decoration from the rest of the part.

In one embodiment not shown, the holding device for the second decoration includes a flange suitable for squeezing the second decoration against the wedge and for sliding the second decoration with respect to the molding cavity. In particular, in this way, a bit of the second decoration can enter into the molding cavity during the closing of the mold, more particularly if the second decoration is not very elastic and the part to be produced is very far from having a flat shape.

The present invention further relates to the manufacturing device comprising the mold and wedge, and, where appropriate, the first gripping tool and/or the second gripping tool 42 and/or the hook 100.

In the manufacturing, the presence of the second decoration against the first decoration produces a special visual effect, by overlaying materials, in an easy way. The wedge holds the first decoration thus contributing to achieving a satisfactory final appearance, while providing sealing between the first mold part and the second mold part at this level.

The invention claimed is:

1. A manufacturing method for a trim element, comprising the following steps:
    supplying a mold comprising a first mold part and a second mold part, wherein the first mold part has a first molding surface, the second mold part has a second molding surface, the mold being movable between at least an open configuration and a closed configuration, the first molding surface and the second molding surface together delimiting at least partially one molding cavity in the closed configuration of the mold, wherein the mold is in the open configuration,
    positioning a first decoration against the first molding surface, the first decoration being preformed,
    positioning a wedge in contact with at least one edge of the first decoration, the wedge being suitable for holding, at least partially, the first decoration against the first molding surface of the first mold part,
    after the positioning of the first decoration and the positioning of the wedge, positioning a second decoration, the second decoration being placed in contact with the wedge holding the first decoration, wherein the second decoration is flexible,
    closing the mold in the closed configuration, wherein the second decoration is arranged between the first mold part and the second mold part after the closing of the mold, and
    after the closing of the mold, back-injecting a substrate into the molding cavity, wherein the second decoration is pushed against the first decoration by the substrate during back-injection of the substrate.

2. The manufacturing method according to claim 1, wherein, after closing the mold, the second decoration is squeezed between the second mold part and the wedge.

3. The manufacturing method according to claim 1, wherein the first decoration is provided with a thermoadhesive layer on a contact surface, the second decoration being pushed against the contact surface during the back-injection.

4. The manufacturing method according to claim 1, wherein the wedge partially delimits the molding cavity with the first molding surface and the second molding surface.

5. The manufacturing method according to claim 1, wherein the second decoration is held onto the first mold part, after the positioning thereof.

6. The manufacturing method according to claim 1, wherein a hook is connected to the second mold part, the hook having a holding position, wherein the hook is adapted to hold the wedge against the second mold part, and a free position, wherein said hook does not hold the wedge against the second mold part.

7. The manufacturing method according to claim 6, wherein the hook rotates with respect to the second mold part between the holding position and the free position.

8. The manufacturing method according to claim 6, wherein the second mold part is provided with a return element which brings the hook back into the holding position.

9. A manufacturing method for a trim element, comprising the following steps:
    supplying a mold comprising a first mold part and a second mold part, wherein the first mold part has a first molding surface, the second mold part has a second molding surface, the mold being movable between at least an open configuration and a closed configuration, the first molding surface and the second molding surface together delimiting at least partially one molding cavity in the closed configuration of the mold, wherein the mold is in the open configuration,
    positioning a first decoration against the first molding surface, the first decoration being preformed,
    positioning a wedge in contact with at least one edge of the first decoration, the wedge being suitable for holding, at least partially, the first decoration against the first molding surface of the first mold part,
    after the positioning of the first decoration and the positioning of the wedge, positioning a second decoration, the second decoration being placed opposite the first mold part, wherein the second decoration is flexible,
    closing the mold in the closed configuration, wherein the second decoration is arranged between the first mold part and the second mold part after the closing of the mold, and
    after the closing of the mold, back-injecting a substrate into the molding cavity, wherein the second decoration is pushed against the first decoration by the substrate during back-injecting of the substrate.

* * * * *